May 7, 1957     C. AMBRETTE     2,791,187
DOUGH SHEETING DIE
Filed Jan. 4, 1956     2 Sheets-Sheet 1
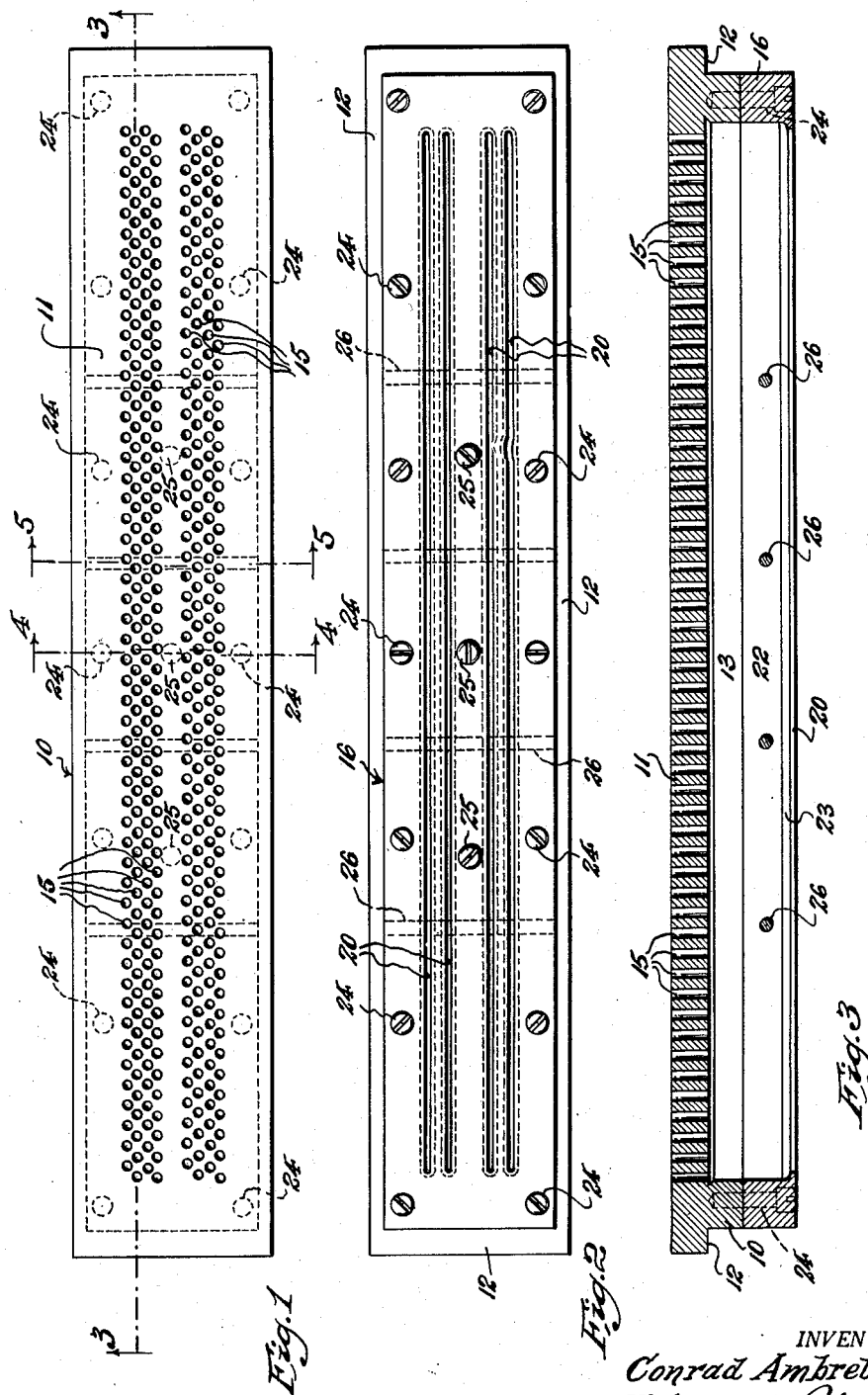
INVENTOR.
Conrad Ambrette,
BY George D. Richards
Attorney May 7, 1957 — C. AMBRETTE — 2,791,187
DOUGH SHEETING DIE Filed Jan. 4, 1956 — 2 Sheets-Sheet 2

INVENTOR.
Conrad Ambrette,
BY George D. Richards
Attorney y which the die structure can be supported in a place of use and in relation to means (not shown) for supplying, under pressure thereto, a dough mixture desired to be sheeted by extrusion through the die structure. Below the top wall 11 of the body member 10, the hollow interior of said body member is arranged to provide one or more downwardly open plenum chambers 13. In the illustrative embodiment shown, two such plenum chambers 13 are provided, the same being separated, one from the other, by an intermediate longitudinally extending partition wall 14. The areas of the top wall 11 which respectively overlie the respective plenum chambers 13, are each pierced by a multiplicity of downwardly and inwardly extending openings or passages 15. Said openings or passages 15 are symmetrically arranged in closely spaced rows to form groups thereof substantially respectively coextensive with the length and width of a plenum chamber 13 above which they lie and with which they communicate.

2,791,187

DOUGH SHEETING DIE

Conrad Ambrette, Brooklyn, N. Y., assignor to Ambrette Machinery Corporation, Brooklyn, N. Y., a corporation of New York Application January 4, 1956, Serial No. 557,309

2 Claims. (Cl. 107—14)

In the production of certain kinds of dough products, it is desirable to form the dough mixture into a sheet or sheets of suitable selected thickness. The sheet dough, according to the kind of ingredients making up the dough mixture, can be used as sheet stock subject to slitting for production of noodles, or subject to cooking and subsequent subdivision for the production of so-called dry cereal products, or for the production of cracker stock and the like, pie crust or the like, or for production of any other products formed or developed from sheet dough. The sheeting of dough for such purposes has heretofore ordinarily been effected by rolling out an initial dough mass into sheet form. Such rolling procedure is laborious and time consuming, and generally involves the working of the dough in separate batches, rather than in a continuous manner.

The present invention relates to improved means for sheeting dough by a continuous extrusion process rather than by batch rolling; and, to this end, this invention has for an object to provide an improved die structure through which a dough mixture, fed under pressure thereto, will be extruded in the form of a continuous sheet of suitable selected thickness.

The invention has for a further object to provide a dough sheeting die which, preliminary to final extrusion of the dough therefrom in sheet form, will thoroughly knead the dough mixture into a softened plastic condition, and thereafter consolidate the dough mixture into a solid uniformly plastic mass subject to final extrusion through long and narrow die aperture or apertures operative to shape the dough into desired sheet formation.

The above and other objects will be understood from a reading of the following description of this invention in connection with the accompanying drawings, in which:

Fig. 1 is a top plan view of a dough sheeting die according to this invention; Fig. 2 is a bottom plan view thereof; and Fig. 3 is a longitudinal sectional view of the same, taken on line 3—3 in Fig. 1.

Figure 4:
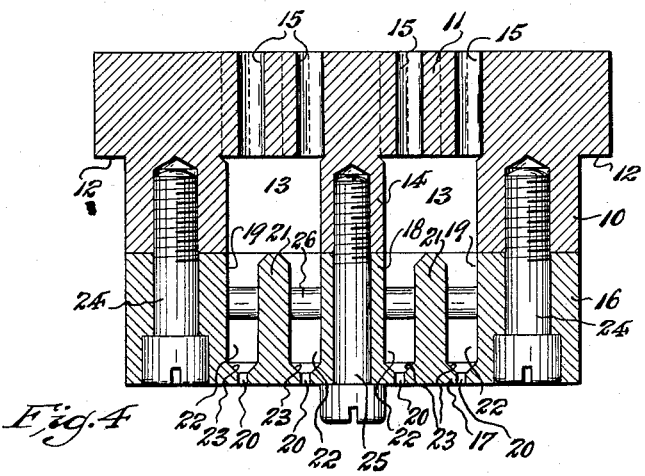
Fig. 4 is a vertical cross-sectional view, taken on line 4—4 in Fig. 1.
Figure 5:
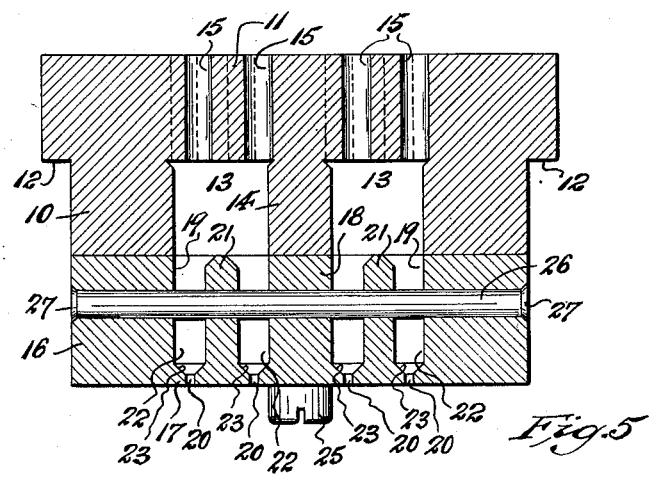
Fig. 5 is another vertical cross-sectional view, taken on line 5—5 in Fig. 1; these views being drawn on an enlarged scale.

Referring to the drawings, the dough sheeting die structure according to this invention is shown in an illustrative embodiment thereof which is operative to simultaneously produce four dough sheet formations, but it will be understood that the same may be arranged to produce more or less than such number thereof. As thus shown, the die structure comprises a rectangular body of a length suitable to produce dough sheet formations of desired width. Said die structure body comprises a top section and a bottom section. The top section is provided by a downwardly open hollow body member 10 closed at its upper side by a top wall 11 of substantial thickness. Projecting externally from the longitudinal sides and transverse ends of the body member 10, preferably in the plane of the top wall 11, are marginal extensions or flanges which form supporting shoulders 12

The bottom section of the die structure body is provided by an upwardly open hollow body member 16 closed at its lower side by a bottom wall 17. This hollow body member 16 conforms in length and width to the length and width of the hollow body member 10 of said top section of the die structure body, and, when assembled with the latter, abuts the bottom thereof in closed relation thereto. The hollow interior of the body member 16 is subdivided by a medial longitudinally extending partition wall 18, which abuts the partition wall 14 of the top section body member 10 in aligned relation thereto, when the bottom section body member 16 is assembled in closed relation to said top section body member, thus dividing the interior of the body member 16 into two chambers 19 into which respectively open the respective plenum chambers 13 of the top section body member 10.

The bottom wall 17 of the bottom section body member 16 is provided with laterally spaced apart, longitudinally extending die slots 20, which substantially correspond in length to the length of the chambers 19, or to the width of dough sheet desired to be produced. Said die slots 20 are dimensioned in width to correspond to the thickness of dough sheet desired to be produced. Two such die slots 20 open out from each said chamber 19. Preferably, said chambers 19 are each longitudinally subdivided, intermediate the die slots 20 with which they communicate, by partition walls 21, thus providing respective separate feed passages 22 leading from the plenum chambers 13 to the respective die slots. The lower ends of said feed passages 22 are shaped to provide downwardly and inwardly inclined terminal wall sections 23, which converge upon the die slots 20, thus providing funnel shaped guide mouths by which the dough to be extruded through said die slots is led thereto.

Any suitable fastening means may be employed to fasten together the bottom and top section body members 10 and 16 in assembled die structure forming relation. As illustratively shown, such fastening means comprises a plurality of longitudinally spaced apart cap screws 24, which are entered through the respective side walls of the bottom section body member 16 to screw into the adjoined side walls of the top section body member 10. To further retain the bottom and top section body members in their assembled relation, and in resistance to relative separation under the pressure of dough forced through the die structure, it is desirable to apply additional cap screws 25 for extension upwardly through the medial partition wall 18 of the bottom body member 16 to screw into the adjoined medial partition wall 14 of the top body member 10.

Means is provided to reenforce the bottom section body member 16 against lateral deformation under internal pressure of dough forced through the die structure. Such means, as shown, comprises a plurality of longitudinally spaced apart tie rods 26, which extend laterally through and across said body member 16 and its interior partition walls 18 and 21, from side wall to side wall thereof; the ends of said tie rods 26 being suitably anchored to said side walls, as by rivet headings 27.

In use of the die structure the same is suitably supported for reception of a dough mixture from a suitable feeding means (not shown), which operates to feed the dough mixture under pressure through and for extrusion from the die structure; said feeding means including means to distribute the delivered dough mixture to and throughout the length of the die structure, in such manner as to keep the plenum chambers and feed passages of the die structure filled with dough at and under substantially uniform extruding pressure throughout the length of the die structure. An example of feeding means so characterized is disclosed in my prior United States Letters Patent No. 2,481,274.

In operation, the dough mixture, in entering the die structure, is first caused to pass through the multiplicity of openings or passages 15 in the top wall of the top section body member 10, and thence into the plenum chambers 13. In passing through said openings or passages 15, the dough is temporarily divided or broken up with a resultant kneading effect thereupon, whereby to eliminate any relatively hard portions or lumps contained therein, and to reduce the dough to a uniformly soft plastic condition. Under the pressure to which the delivered dough is continuously subjected by the dough feeding means, the divided dough upon entering the plenum chambers 13 will be consolidated therein into a solid plastic mass of substantially uniform density free from voids, and which entirely fills the plenum chambers 13 and the feed passages 22, so as to be expressed from said plenum chambers through said feed passages 22 for continuous extrusion through the die slots 20, to issue from the latter in desired dough sheet formations.

Although, by way of illustration, an embodiment of the die structure of this invention has been shown and described which is adapted to produce a plurality of extruded dough sheets, it will be understood that the die structure can be, if desired, modified to provide a single plenum chamber 13, from which dough is passed for extrusion from a single die slot for one sheet production, or from two or more die slots for multiple sheet production.

It will also be understood that various changes in detail construction of the members of the die structure, and in the make up of interior parts thereof, can be made within the scope of the herefollowing claims.

Having now described my invention, I claim:

1. A dough sheeting die through which dough under pressure can be extruded, said die being of length to produce dough sheet formations of selected width, said die comprising a top body member and a bottom body member with means to secure the same together in assembled relation, said top body member having a downwardly open plenum chamber closed by a perforate dough admission top wall, and said bottom body member having an upwardly open chamber closed by a bottom wall having a plurality of laterally spaced longitudinally entending die slots therein, said die slots corresponding in lengths to the widths of dough sheets to be extruded therethrough and of widths corresponding to desired thickness of said dough sheets, means to subdivide said chamber of the bottom member whereby to form respective dough passages leading from the plenum chamber of the top member to the respective die slots for extrusion of dough therethrough, and a plurality of longitudinally spaced reenforcing rods extending transversely through the bottom body member from said to side thereof.

2. A dough sheeting die according to claim 1, wherein the top body member is provided along its sides and ends with externally projecting flange portions forming carrying shoulders by which the die can be supported in a place of use.

References Cited in the file of this patent
UNITED STATES PATENTS

| 2,679,216 | Grondona | May 25, 1954 |

FOREIGN PATENTS

| 438,893 | Italy | Aug. 28, 1948 |
| 452,563 | Italy | Oct. 25, 1949 |